July 17, 1956 W. D. GABOR 2,755,446
VARIABLE INDUCTANCE CONTROL METHOD AND APPARATUS
Filed June 30, 1951 2 Sheets-Sheet 1
FIG. I.
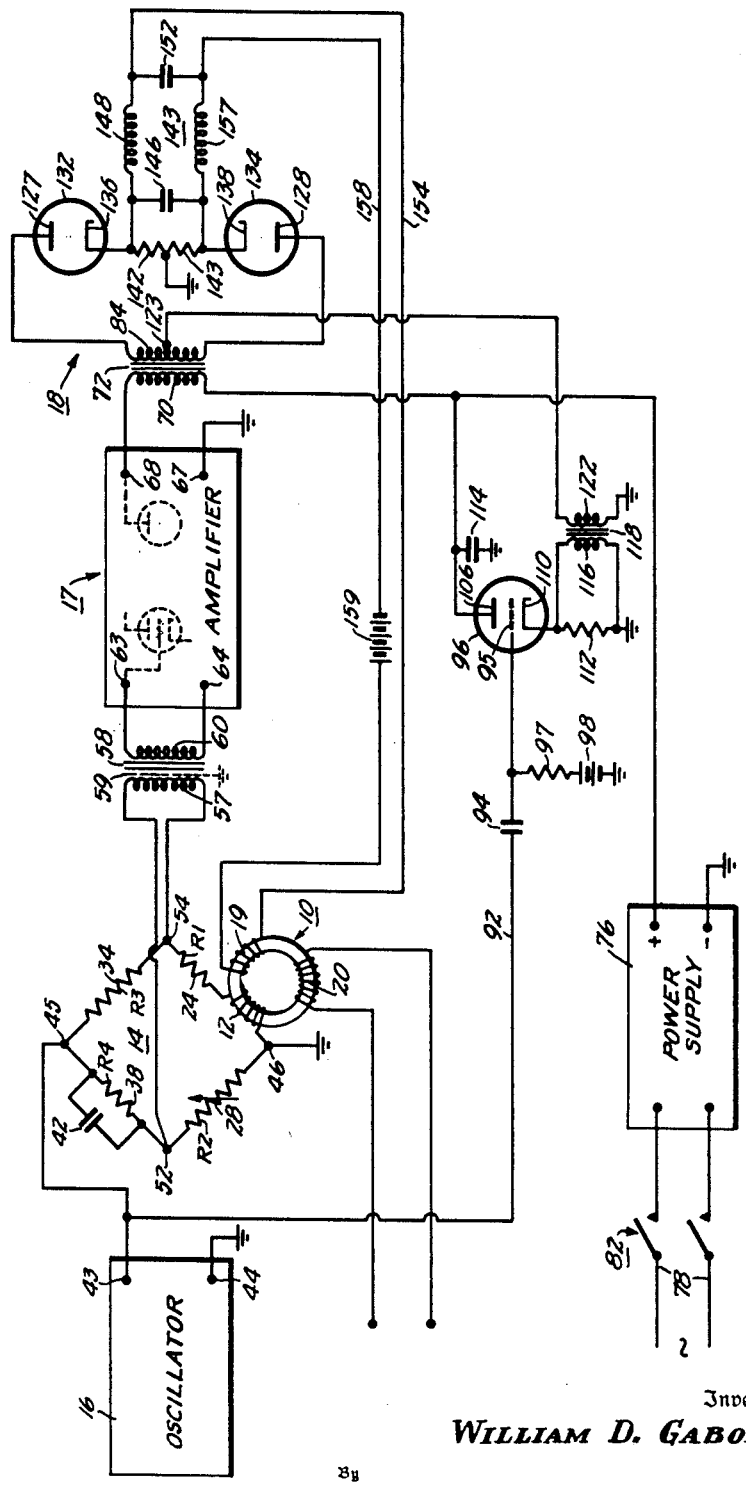
Inventor
WILLIAM D. GABOR
By
Curtis, Morris & Safford
Attorneys

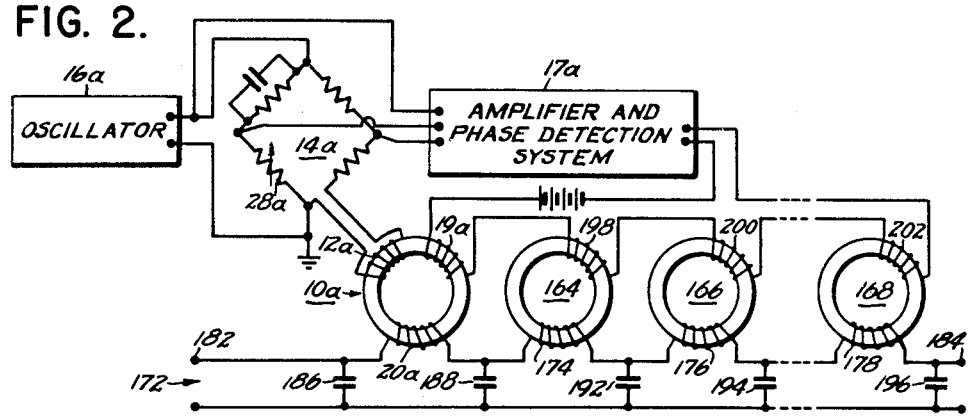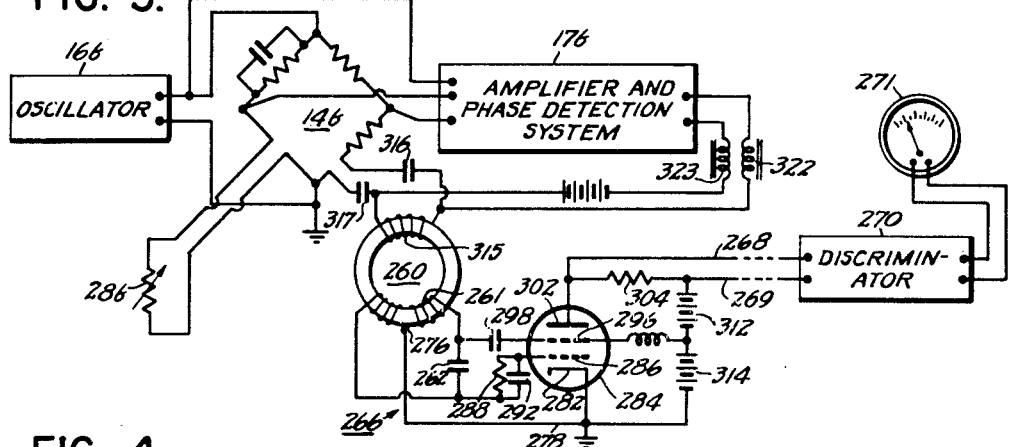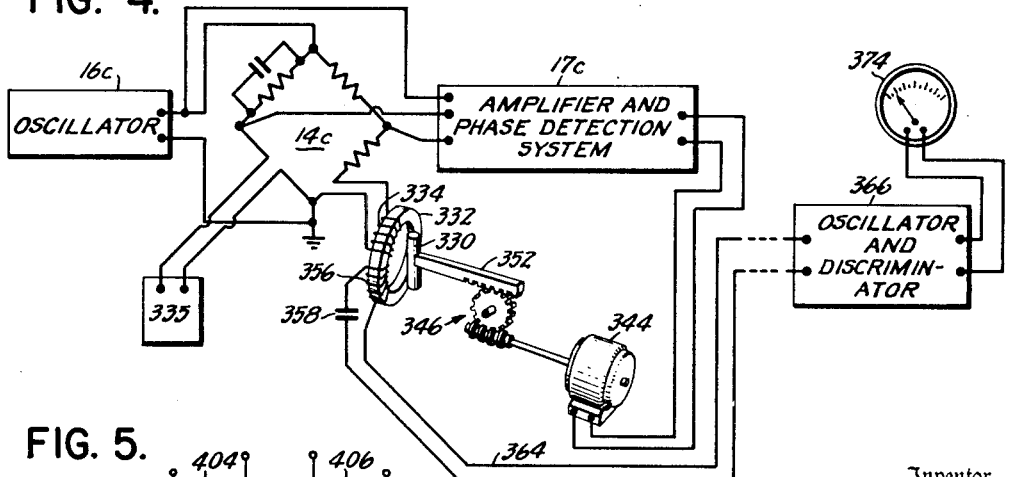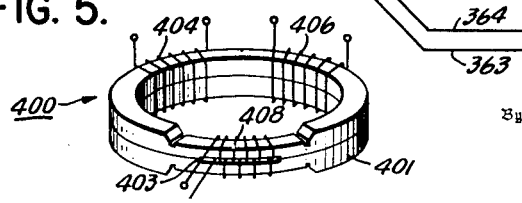

United States Patent Office 2,755,446
Patented July 17, 1956

2,755,446

VARIABLE INDUCTANCE CONTROL METHOD AND APPARATUS

William D. Gabor, Norwalk, Conn., assignor to C. G. S. Laboratories, Inc., Stamford, Conn., a corporation of Connecticut Application June 30, 1951, Serial No. 234,581

17 Claims. (Cl. 333—18)

The present invention relates to inductance control apparatus and to such apparatus in which a controlled inductance is used for measurement, communication, or control functions. The present invention is described as embodied in apparatus for regulating or controlling the inductance of one or a plurality of inductors having a core material of a ferromagnetic ceramic or "ferrite."

It is now known in the art that certain alloys or ceramic materials known as "ferrites" or "ferromagnetic ceramics" have properties that make them promising as core materials for inductors. Some of the properties and specific compositions of these ferromagnetic ceramics are described, for example, in U. S. Patents 2,452,529; 2,452,530; and 2,452,531.

One of the properties of these ferromagnetic ceramics is that they have a relatively high permeability so that under proper conditions an inductor utilizing a small amount of this material as a core will exhibit a relatively high inductance. Another property of this material is that it has a relatively low saturation flux density, or in other words, its incremental permeability is greatly affected by small changes in the degree of magnetic saturation. If such a core is subjected to a direct current magnetic field, sometimes referred to as a "bias" field, the reactance of a coil wound on the core to the flow of a low-amplitude alternating current signal is decreased markedly.

By using inductors with this core material and by altering the magnetic condition of the core with a bias field, it is possible to realize a variable inductance which can be varied over ranges as wide as 200 to 1.

Another property of ferromagnetic ceramics is that they have relatively low loss characteristics, that is, the ratio between the energy stored per cycle by an inductor with this core material and the energy uselessly dissipated per cycle, is high over a wide range of operating conditions. This ratio, called the Q, is a measure of the quality of the inductor as an energy storage device. Thus, the Q of inductors utilizing ferromagnetic ceramic core material has been found to be high even when the core material is subjected to substantial magnetic fields and even when the inductor is used at frequencies of the order of megacycles.

Certain disadvantageous characteristics of ferromagnetic ceramics, however, have limited their use as core materials in inductors, particularly their sensitivity to changes in temperature. Moreover, the inductance of a coil wound on such material is a function of the past history of the core, so that the inductance at a particular time depends upon the previous state of core saturation. Also, changes in electrical loading affect their permeability and hence the inductance of a coil wound on such a core. In addition, it is difficult to replace such an inductor, for inductors using this core material have individualistic electrical properties so that two such inductors which are of the same dimensions are likely to have different electrical and magnetic characteristics.

Accordingly, an object of this invention is to provide apparatus for controlling or regulating the inductance of one or more inductors and by which the inductance may be stabilized and held at a predetermined value irrespective of changes in temperature or electrical load, and by which the hysteresis effects are overcome.

Another object of the present invention is to provide apparatus for precisely adjusting the inductance of one or more inductors having a ferromagnetic ceramic core material.

Another advantage of the invention resides in providing controlled inductance with a relatively high Q for use in various electrical applications for measurement, control, communication, and similar functions.

Other objects relate to improved ferromagnetic ceramic components and combinations of components having use in measurement, control, and communication systems as well as in other apparatus, and particularly to improved controlled and variable inductance components.

Other objects, advantages, and features of the present invention will be in part apparent from, and in part pointed out in, the following description considered in conjunction with the accompanying drawings, in which:

Figure 1 is a diagrammatic representation of an inductance control circuit embodying the present invention;

Figure 2 is a diagrammatic representation of an inductance control circuit embodying the present invention arranged to control the inductance of a series of inductors in a delay line;

Figure 3 is a diagrammatic and schematic representation of the telemetering system embodying the present invention;

Figure 4 is a diagrammatic representation of a telemetering system embodying the present invention and using a permanent magnet to control the inductance of an inductor; and Figure 5 is a perspective view of an inductor such as may be used in the circuits of Figures 1 and 2 and, with certain changes, in the circuits of Figures 3 and 4.

In the various figures of the drawings similar parts or elements are identified by the same reference numeral followed by a small letter corresponding to the particular figure in which the part or element is shown.

Briefly, the operation of the inductance control circuit of Figure 1 is as follows: An inductor, gen-magnetic ceramic, is provided with an inductance-measuring winding 12 which is included in a bridge circuit generally indicated at 14, suitably energized by an oscillator 16. The output from the bridge circuit 14 is used to control an amplifier, indicated in block form at 17, and a phase detection system, generally indicated at 18, which provide a suitable control current for a control winding 19 on the inductor 10.

This control current flowing through the winding 19 acts to maintain the inductance of inductor 10 at such value that the bridge 14 is in balance and therefore so that the output of the bridge 14 is at a minimum. Thus, the inductance of inductor 10 is stabilized or controlled at a value corresponding to the setting of the bridge 14, and an inductance or signal winding 20 on inductor 10 can be used to supply the controlled inductance for any desired external circuit.

The bridge circuit 14 includes a first arm comprising the measuring winding 12 connected in series with a resistor 24, a second arm comprising a variable resistor 28, a third arm comprising a resistor 34, and a fourth arm comprising the parallel combination of a resistor 38 and condenser 42. Changes in the setting of the variable resistor 28 change the setting of the bridge 14 and hence change the inductance of inductor 10, as described hereinafter.

In order to energize the bridge 14 with an A. C. voltage of suitable frequency, such as 1,000 C. P. S., the oscillator 16 has its output terminals 43 and 44 connected to the energizing terminals 45 and 46 of the bridge 14. The connection to the bridge input terminal 46 is made through the common ground circuit.

The inductance-measuring winding 12 on inductor 10 presents a reactance to the bridge 14 depending upon the permeability of the core 10, and because the permeability depends upon the strength of the bias magnetic field, the winding 12 serves to present continuously to the bridge 14 a reactance which measures the magnetic condition of the core 10.

By selecting the values of the bridge elements so that the product of the values of resistors 24 and 38 is equal to the ratio of the inductance of winding 12 to the capacity of condenser 42, the balance condition of the bridge can be made independent of frequency, the resistance of the winding 12 being included in the value assigned to resistor 24. Thus, at balance:

$$\frac{R_{38}}{R_{28}} \frac{1}{1+jwR_{38}C_{42}} = \frac{R_{34}}{R_{24}+jwL_{12}}$$

or $$\frac{R_{38}}{R_{28}} \frac{1}{1+jwR_{38}C_{42}} = \frac{R_{34}}{R_{24}} \frac{1}{1+jw\frac{L_{12}}{R_{24}}}$$

If $$R_{38}R_{24} = \frac{L_{12}}{C_{42}}$$

then, at balance, $$\frac{R_{38}}{R_{28}} = \frac{R_{34}}{R_{24}}$$

and the balance condition is seen to be independent of frequency and to depend only upon the values of the circuit constants, and any fluctuations in the output of oscillator 16 will not affect the control of the inductor 10.

Whenever the inductance of winding 12 changes to unbalance the bridge 14, an alternating voltage of frequency corresponding to the frequency of the signal delivered by the oscillator 16, appears between bridge output terminals 52 and 54. This voltage is connected from the bridge output terminals to the primary winding 57 of a transformer 58 having a grounded electrostatic shield 59. The secondary winding 60 of this transformer is connected to the input terminals 63 and 64 of the amplifier 17. The amplifier 17 may be of any design suitable for amplifying the alternating voltage.

The amplifier output terminal 67 is connected to the common ground circuit and the other output terminal 68 is connected through the primary winding 70 of an output transformer 72 to the positive terminal of a conventional power supply 76, which is energized from power mains 78 through a main switch generally indicated at 82.

The secondary winding 84 of the output transformer 72 is connected to the phase discriminating and rectifying circuit, generally indicated at 18.

In order to supply the phase-detection circuit 88 with a reference A. C. voltage from the oscillator 16, a lead 92 is connected from the terminal 43 on the oscillator 16 through a coupling condenser 94 to a control grid 95 of a cathode-follower tube 96. A ground return circuit is provided through a grid resistor 97 and a grid-bias battery 98. The anode 106 of this tube is connected directly to the positive terminal of the power supply 76. The cathode 110 of this tube is connected to the common ground circuit through a load resistor 112. A by-pass condenser 114 is connected between the anode 106 and ground.

The A. C. signal appearing across the cathode resistor 112 is coupled through the primary winding 116 of a transformer 118 to the secondary winding 122 and is applied between the common ground circuit and a centertap 123 on the secondary winding 84 of the transformer 72. The cathode-follower circuit drives the center tap 123 of secondary 84 above and below ground potential in phase with the A. C. signal supplied by the oscillator 16, while isolating oscillator 16 from any load changes caused by the amplifier or phase detector.

The ends of secondary winding 84 of the transformer 72 are connected respectively to the plates 127 and 128 of a pair of diodes 132 and 134. The cathodes 136 and 138 of these tubes are connected to the common ground circuit through similar resistors 142 and 143, respectively.

The cathodes 136 and 138 are also connected to a filter circuit, generally indicated at 143. The cathode 136 is connected to one plate of a filter condenser 146, through a filter choke 148, to one plate of another filter condenser 152, and then through a lead 154, to the control winding 19 on the inductor 10. The cathode 138 is connected to the other plate of the condenser 146, through a choke 157, to the other plate of the condenser 152, and then through a lead 158 and a source of bias current 159 to the other end of the winding 19.

The bias source 159 serves to provide a bias current flowing in winding 19 so as to establish a bias magnetic field in the ferromagnetic core material of the inductor 10. This bias current flows through a loop from the bias source 159 through winding 19, lead 154, choke 148, resistors 142 and 143, choke 157, and lead 158 to the other terminal of the bias source 159. The magnitude of this bias current is determined, among other things, by the voltage of the source 159 and the total resistance in the loop circuit described above. The voltage of bias source 159 should at least equal the voltage appearing across the condenser 146 when the bridge 14 is at its maximum unbalance caused by the inductor 10 having a smaller inductance than that corresponding to the setting of the variable resistor 28, thus the sum of bias and control current combined can never pass through zero and reverse direction, which would drive the bridge 14 away from balance.

The operation of the inductance control circuit of Figure 1 is as follows: Assuming that the bias field produced by the bias source 159 is not sufficient to produce an inductance corresponding to the setting of the variable resistor 28, then the inductance of inductor 10 will be too large and the bridge 14 will be unbalanced. The A. C. signal caused by the unbalance of the bridge 14 appears across the output terminals 52 and 54 and is amplified by the amplifier 17 and is fed to the phase detection and rectifier circuit 18 through the output transformer 72. This A. C. signal drives the plates 127 and 128 of diodes 132 and 135, respectively, in opposite directions, and during each half cycle the polarity reverses so that as one of these plates is driven positive, the other plate is driven negative. At the same time, an A. C. signal from the oscillator 16 is fed through the cathode follower tube 95 to the centertap 123 of the secondary winding 84 driving it alternatively positive and negative. The polarity of the voltage at the centertap 123 may be in phase with the voltage either at the plate 127 or the plate 128, depending upon the direction of the unbalance of bridge 14, that is, upon whether the inductance of the inductor 10 is larger or smaller than the value corresponding to balance. The circuit connections are such that when the bias source 159 produces a bias field in inductor 10 causing winding 12 to exhibit too large an inductance, then the output from the phase detection and rectifier circuit 18 aids the bias source 155 so as to reinforce the magnetic bias field and hence reduce the inductance of the inductor 10 to the desired value, i. e. corresponding to the setting of variable resistor 28. When the bias field is such that winding 12 has too little inductance, the bridge 14 is unbalanced in the opposite direction, causing a decrease in bias current through the winding 12.

Assuming that the voltage at centertap 123 is in phase with the voltage at plate 127, caused by the voltage induced in the transformer secondary winding 84, these two voltages aid to produce a large positive voltage at the plate 127, in turn causing a large current to flow through diode 132 and from cathode 136 through the resistor 142 to ground. This current causes a positive voltage to appear at the cathode 136. Since the plate 128 of diode 134 is negative, no current flows through the diode 134 nor through the resistor 143 except for the current from the bias source 155 and hence the other terminal of the condenser 146 is near ground potential, and the condenser 146 is charged by the diode 132.

When the plate 128 is driven positive during the next half cycle by the voltage induced in the transformer secondary winding 84, the voltage at the centertap 123 is being driven negative by the cathode-follower tube 95. These two voltages are opposed, resulting in only a small positive voltage on the plate 128. Consequently, only a small current flows from the cathode 138 through the resistor 143 to ground. Thus, only a small positive voltage appears at the cathode 138 and only a small portion of the charge on the condenser 146 is removed during the half-cycle when diode 134 is conducting. The time constant of the loop circuit including the resistors 142 and 143 and the condenser preferably is sufficiently large so that very little of the charge on condenser 146 leaks off through resistor 142 during each cycle. In this explanation, it was assumed that both diodes conducted during alternate half-cycles, but it is apparent, of course, that under different degrees of unbalance of the bridge 14, only one of the diodes may conduct, the voltage of centertap 123 serving to suppress conduction during alternate half-cycles.

Thus, it is seen that this circuit automatically adjusts the saturation level of the core material to maintain the inductance of winding 12 as a known predetermined function of the value of variable resistor 28 and that the controlled condition is independent of changes in temperature and the like. Because the winding 20 is wound on this controlled core, its inductance is controlled precisely. Furthermore, this circuit allows continuous control or regulation of the inductance of winding 20 at any desired value over a range of 200 to 1, which can be obtained with ferromagnetic ceramic cores, for readjustment of the variable resistor 28 immediately causes a corresponding readjustment in the inductance of the winding 20. If, for any reason, it is necessary to replace the inductor 10, the replacement will be controlled at the same value of inductance.

Although a particular control circuit is described herein, it is apparent that many different control circuits can be used. The use of the filter chokes 148 and 156 and of the filter condenser 152 is optional, for they merely filter the D. C. current supplied to the control winding 18, which may only be desirable when the bias field in the inductor 10 is to be maintained with substantially no ripple. Also, it should be noted that although the windings 12 and 19 on the inductor 10 are shown as two separate windings, a single winding may be used to perform the functions of both, as explained hereinafter. Furthermore, instead of the use of the bias source 159, it is possible to associate a permanent magnet with the inductor 10 to establish the bias field. Another way of obtaining the bias field in inductor 10 is to energize the measuring winding 12 with a D. C. current in addition to the alternating current supplied by oscillator 16.

It is clear that the desired bias flux can be obtained by means of a separate bias winding connected to a suitable source of bias potential, so that the battery 159 can be eliminated from the control circuit.

In Figure 2 is shown a diagrammatic representation of an inductance control circuit for controlling the inductance of a number of similar inductors, generally indicated at 10a, 164, 166, and 168 in an electrical delay line, generally indicated at 172.

Each of these inductors 10a, 164, 166 and 168 has an inductance or signal winding 20a, 174, 176, and 178, respectively, and these windings are serially connected in the relay line 172 between input terminal 182 and output terminal 184. The delay line 172 also includes a number of condensers 186, 188, 192, 194, and 196 connected in conventional manner across the delay line. As is well known in the art, such a delay line may be used to delay the transmission of electrical impulses passing therethrough in either direction, and the delay time is a function of the inductance of the windings 20a, 174, 176, and 178.

In order to control the inductance of the inductors 10a, 164, 166 and 168 so that the delay time of the line 172 can be varied at will and with precision, and in order to stablize each of them so that environmental changes such as temperature, or load, etc. will have no effect upon the inductance of these inductors and hence no effect upon the delay time of the line 172, a control arrangement similar to Figure 1 is provided. The oscillator 16a, the bridge, generally indicated at 14a, and the amplifier and phase detection system 17a correspond to the components of Figure 1, the principal difference being that the control windings 198, 200, and 202 of inductors 164, 166, and 168 are connected in series with the control winding 19a of inductor 10a, the latter being the only inductor that is provided with a measuring winding 12a which is connected into the bridge circuit 14a.

The control circuits operate as described in connection with Figure 1 to control the inductance of winding 20a of inductor 10a. Because the inductors have the same characteristics and are subjected to the same ambient and operating conditions, the same control current is utilized to control each of the inductors. Thus, the circuit of Figure 2 stabilizes the inductance of each of the inductors 10a, 164, 166 and 168 and hence stabilizes the delay time of the line 172.

In order to vary the delay time of line 172, it is only necessary to vary the resistance of the variable resistor 28a. For instance, a motor can be connected to drive the variable resistor over a cycle of values of resistance, and the delay time of line 172 would cyclically follow these values, or the resistor 28a can be manually controlled, to regulate the delay time of line 172. The resistance 28a may be replaced by electronic control means, if desired, so that the delay line can be adapted readily for use in radar, control, measuring, and communication systems.

In Figure 3 is shown a diagrammatic representation of a telemetering system embodying the present invention. In this embodiment, a variable inductor 260, having a core of ferromagnetic ceramic, is arranged with its inductance winding 261 connected in parallel with a condenser 262 to form a tuned circuit, of a Hartley-type oscillator, generally indicated at 266.

Briefly, the operation of this telemetering circuit is as follows: The frequency of the oscillator 266 is determined by the inductance of the winding 261 of the variable inductor 260, and the output signal of the oscillator is transmitted over a pair of long distance leads 268 and 269, or by other means, to a discriminator 270 which produces an output signal whose magnitude is a function of the frequency of the received signal. This output current, for example, may operate a meter 271, which in effect indicates the inductance value of the remotely located inductor winding 261.

The inductance of this winding 261 in turn is controlled by the value of a variable resistor 28b, which can be made responsive to a condition which is being measured. Thus, meter 271 indicates the value of the resistor 28b and hence indicates the status of the condition under measurement.

In the oscillator circuit, the inductance winding 261 is provided with a centertap 276, connected by a lead 278 to the grounded cathode 282 of a beam power tube 284. The control grid 286 of this tube is connected through a grid-leak resistor 288 and grid condenser 292 to one end of the winding 261. The screen grid 296 of this tube is connected through a blocking condenser 298 to the other end of winding 261. As is well known in the art, with this type of connection, the tube 284 acts as a triode oscillator, with the screen-grid 296 acting as the anode in the oscillator circuit. Its plate 302 is coupled to the oscillator circuit by means of the electrons passing through the screen-grid 296, and the plate load resistor 304 develops an A. C. voltage at the resonant frequency of the tuned circuit.

This A. C. voltage across resistor 304 is connected to the distant discriminator 270 by the long distance leads 268 and 269. Conventional power supply means, indicated diagrammatically by the batteries 312 and 314 are provided.

The connections of oscillator 16b and bridge 14b are not described in detail, for they are similar to the circuits of Figures 1 and 2. The inductance measuring winding 315 is connected into the bridge circuit 14b through a pair of coupling condensers 316 and 317. The coupling condensers 316 and 317 are sufficiently large so that their reactance is negligible at the frequency supplied by the oscillator 16b, and hence the mathematical analysis made in connection with the bridge 14 in Figure 1 is valid for bridge 14b. Thus, the balance point of bridge 14b is independent of variations in the frequency of oscillator 16b. It should be noted that by using the coupling condensers 316 and 317, the winding 315 is made to serve both the measuring function for bridge 14b and also the controlling function. Consequently, inductor 260 need carry only two windings. The filter chokes 322 and 323 should have inductances much larger than the inductance of winding 315.

In operation, the variable resistor 28b is arranged to vary in accordance with a condition under measurement. These variations in the resistor 28b cause the inductance of the winding 261 to vary correspondingly, and this causes the frequency of the oscillator 266 to vary, thus changing the indication of the meter 271.

In Figure 4 is shown a diagrammatic representation of a telemetering system embodying the present invention and using a movable permanent magnet 330 to control the inductance of an inductor 332 having a core of ferromagnetic ceramic material. The inductor 332 has a measuring winding 334 included in a bridge circuit 14c which is identical with the bridge 14b of Figure 3 except that the variable resistance 28b in Figure 3 is replaced in Figure 4 by a diagrammatic representation of a unit at 335 containing a resistive condition under measurement.

The oscillator 16c energizes bridge 14c and the output the bridge 14c is fed to an amplifier and phase detection system 17c. The output signal from system 17c drives a reversible D. C. motor 344. This motor 344 drives a worm and gear, generally indicated at 346, that operates a rack 352 to position the permanent magnet 330. When the bridge 14c is unbalanced in one direction, the motor 344 drives the permanent magnet 330 nearer to the inductor 332, thus increasing the magnetic bias in the core thereof and reducing its inductance, and drives the magnet 330 away from the inductor 332 when the bridge is unbalanced in the opposite direction.

Thus, the inductance of the inductor 332 is stabilized continuously by the action of the oscillator 16c, bridge 14c and the amplifier and phase detection system 17c. Furthermore, the inductance of inductor 332 is controlled by the resistance value of unit 335. An inductance or signal winding 356 of the inductor 332 in series with a condenser 358 forms a series resonant circuit which is connected by two long-distance leads 362 and 363 to an oscillator and discriminator, shown in block form at 366, of a type shown in the copending patent application of Carl G. Sontheimer, Serial No. 65,094, filed December 14, 1948.

Thus, as the resistive condition in unit 335 changes, the inductance of winding 356 changes and alters the resonant frequency of the series resonant circuit. The frequency of the oscillator and discriminator 366 is changed, resulting in a different output of the meter 374. Thus, meter 374 continuously shows the condition of remotely located unit 336, and this reading will be independent of variations in shunt capacity between the leads 362 and 363 as described in any earlier application.

A preferred form of variable inductor, generally indicated at 400 in Figure 4, has an annular core 401 composed of a ferromagnetic ceramic material, one portion of which is slotted as shown at 403.

A measuring winding 404 is wound around an unslotted portion of the core 401, and a bias and control winding 406 is wound around another un-slotted portion of the core as shown.

An inductance or signal winding 408 is divided into two halves, and each half is wound around one-half of the cross-section of the slotted core as shown. In order to minimize the coupling between both the measuring winding 404 and the bias and control winding 406 and the signal winding 408, the two halves of the signal winding 408 are wound in opposite directions, so that any voltages induced in the winding 408 caused by changes in the bias field of winding 406 or the field of winding 404 will oppose each other and cancel out. Likewise, the magnetic field caused by the signal winding 408 will be limited substantially to the slotted portion of the core 401 and will not interfere with the measuring winding 404.

Alternatively, the interaction between the measuring winding 404 and the signal winding 408 can be minimized by forming the measuring winding 404 of two equal and oppositely wound portions while using a continuously wound coil for winding 408.

What is claimed is:

1. An inductance control circuit including a balanceable electrical network means for adjusting the balance condition of said network, an alternating current source connected to said network, a plurality of inductors each having a saturable core and an inductance winding, a sensing winding included in said balanceable network and coupled to one of said cores, whereby the balance of said network is made responsive to the degree of magnetic saturation of said one core, and means responsive to unbalance in the network for modifying the magnetic condition of each of said cores in the same direction so that as the effective inductance of said sensing winding is altered in such direction as to tend to restore the network to balanced condition, the inductance of all of said inductance windings is controlled by the adjustment of said network adjusting means.

2. An inductance control circuit including a balanceable electrical network, an alternating current source connected to said network, a plurality of inductors subjected to substantially the same ambient conditions and each having a saturable core, one of said cores being coupled to said network in such manner that the balance condition of said network is a function of the degree of magnetic saturation of said core, means responsive to unbalance of said network for modifying the magnetic saturation of the one of said cores that is coupled to said network in such direction as to tend to restore the network to balanced condition, and means under control of said last said means arranged to produce a corresponding change in the magnetic saturation of the other of said cores.

3. An inductance control circuit including a balanceable electrical network, an alternating current source connected to said network, a plurality of inductors subjected to substantially the same ambient conditions and each having a saturable core and a control winding, one of said cores being coupled to said network in such manner that the balance condition of said network is a function of the degree of magnetic saturation of said core, a control circuit including each of said control windings, current-producing means responsive to unbalance of said network, and circuit means connecting the current produced by said last said means to said control circuit so as to modify the magnetic saturation of each of said cores, the change in saturation being in such direction as to tend to restore said network to balance condition.

4. An inductance control circuit including a plurality of inductors subjected to substantially the same ambient conditions and each having a saturable core and a control winding, a balanceable electrical network, an alternating current source connected to said network, means coupling one of said cores to said network in such manner that the balance condition of said network is a function of the degree of magnetic saturation of said core, control circuit means connecting said control windings in series, and current generating means coupled to said control circuit and responsive to unbalance of said network for modifying the magnetic saturation of each of said cores, the saturation of the one of said cores that is coupled to said network being changed in such direction as to tend to restore the network to balanced condition.

5. An inductance control circuit including a plurality of inductors each having a ferromagnetic ceramic core subjected to substantially the same ambient conditions, a plurality of control windings each coupled to one of said cores, a balanceable electrical network, an alternating current source connected to said network, means coupling one of said cores to said network in such manner that the balance condition of said network is a function of the degree of magnetic saturation of said core, control circuit means connecting said control windings in series, and current generating means coupled to said control circuit and responsive to unbalance of said network for correspondingly modifying the magnetic saturation of each of said cores, the saturation of the one of said cores that is coupled to said network being changed in such direction as to tend to restore the network to balanced condition.

6. A controllable artificial line including a plurality of inductors each having a saturable core subjected to substantially the same ambient conditions and a plurality of condensers connected thereto to form an artificial transmission line, a balanceable electrical network, an alternating current source connected to said network, means coupling one of said cores to said network in such manner that the balance condition of said network is a function of the degree of magnetic saturation of said core, control means responsive to unbalance of said network for modifying the magnetic saturation of the one of said cores that is coupled to said network in such direction as to tend to restore the network to balanced condition, and means under the control of said control means for modifying correspondingly the saturation of the other of said cores, whereby the time delay produced by said artificial line is controlled by said bridge circuit and stabilized against changes in ambient conditions.

7. An inductance control circuit including a balanceable electrical network, a variable element in said network an alternating current source connected into said network, a variable inductor having a core material of ferromagnetic ceramic, winding means surrounding a portion of said core material, a portion of said winding means being included in said network, a portion of said winding means having terminals and being adapted to be coupled into a signal circuit, means responsive to unbalance of the network arranged to supply a current to said winding means for modifying the saturation of the ferromagnetic ceramic core material in such direction as to tend to restore the network to balanced condition, whereby the inductance of said last portion is controlled in accordance with the value of said variable element.

8. An inductance control circuit for controlling the inductance of a variable inductor, and for eliminating the effects of ambient conditions on its inductance value, said circuit including a rebalanceable electrical network having a standard element, a variable element for changing the balance of said network, energizing and output terminals in said network, an alternating current source connected to the energizing terminals of said network, a variable inductor having core means formed of magnetizable material, winding means on said core means, a portion of said winding means being adapted to be connected to an external signal circuit, said portion having the inductance which is to be controlled and which is a function of the degree of magnetic saturation of said core means, a portion of said winding means being coupled to said rebalanceable network to make said rebalanceable network responsive to the degree of magnetic saturation of said core means, a portion of said winding means having control terminals and being adapted to carry a control current for regulating the degree of magnetic saturation of said core means, amplification means, detection means, and circuit means coupling said amplification and detection means between the output terminals of said rebalanceable network and said control terminals, whereby said amplification and detection means are responsive to the unbalance signal from the rebalanceable network to rectify and amplify it and supply a control current to said control terminals which is a function of the unbalance signal rectified and amplified so as to modify the degree of magnetic saturation of the ferromagnetic ceramic core material in such direction as to drive the network back toward balanced condition, whereby the inductance of the portion of said winding adapted to be connected to a signal circuit is controlled in accordance with variations in said variable element and the effects of ambient conditions on its inductance value are substantially eliminated.

9. Apparatus for controlling simultaneously the inductance values of a plurality of separate inductance windings and for overcoming the effects of ambient conditions on the inductance values of the separate inductance windings comprising controllable inductor means including core means formed of magnetizable material, control winding means, and a plurality of separate signal windings, said signal windings and control winding means being coupled to said core means, a rebalanceable network, alternating voltage means coupled to said network, means included in said network responsive to the extent of magnetic saturation of said core means, amplification means, detection means, and circuit means coupling said amplification and detection means to said network and coupling the output from said amplification and detection means to said control winding means.

10. Apparatus for controlling simultaneously the inductance values of a plurality of separate inductance windings and for eliminating the effects of ambient conditions on the inductance values of the separate inductance windings comprising controllable inductor means including core means formed of magnetizable material, control winding means, and a plurality of separate signal windings, said signal windings and control winding means being coupled to said core means, a rebalanceable network having energizing and output terminals, alternating voltage means coupled to said energizing terminals to energize said network, means included in said network responsive to the extent of magnetic saturation of said core means, means for adjusting the balance of said network in accordance with the desired inductance values of said signal windings, amplification means, detection means, and circuit means coupling said amplification and detection means to said output terminals and the output of said amplification and detection means to said control winding means, whereby said amplification and detection means are responsive to changes in the balance conditions of said network to supply control current to said control winding means for controlling the inductance values of said inductance windings in accordance with the adjustments of said network adjusting means.

11. Apparatus for controlling simultaneously the inductance of a plurality of separate inductance windings comprising controllable inductor means including core means formed of magnetizable material, control winding means, and a plurality of separate signal windings, said separate signal windings and control winding means being coupled to said core means, a rebalanceable electrical network having energizing and output terminals, an alternating current source connected to the energizing terminals of said network, said signal windings each being adapted to be connected to an external signal circuit, the inductance of said signal windings being a function of the degree of magnetic saturation of said core means, means coupled to said rebalanceable network to make said rebalanceable network responsive to the degree of magnetic saturation of said core means, said control winding means being adapted to carry current for regulating the degree of magnetic saturation of said core means, a variable element in said network for changing the balance of said network, amplification means, detection means, circuit means coupling said amplification and detection means between the output terminals of said rebalanceable network and said control winding means whereby said amplification and detection means are responsive to the unbalance signal from the rebalanceable network to supply a control current to said control winding means as a function of the rectified and amplified unbalance signals so as to modify the degree of magnetic saturation of said core means in such direction as to rebalance said network and bias means associated with said amplification and detection means for preventing the reversal of said control current, whereby the inductance of all of said signal windings is accurately controlled by said variable element in spite of changes in ambient conditions.

12. The method of controlling simultaneously the inductance values of a plurality of separate inductance windings wound on core means of magnetizable material comprising the steps of sensing the inductance value of one of said inductance windings, comparing the sensed inductance value with a standard in a rebalanceable comparison circuit, generating a signal proportional to the unbalance of said comparison circuit, amplifying and rectifying said unbalance signal, and generating a control flux in said core means as a function of the rectified and amplified signal, whereby the magnetic saturation of said core means is controlled and the inductance values of all of said signal windings are controlled in accordance with the value of said one inductance winding whose inductance is being sensed, and the value of said one inductance winding is controlled in accordance with said standard.

13. The method of controlling the inductance value of an inductance winding wound on core means of magnetizable material comprising the steps of sensing the inductance value of a winding coupled to said core means, comparing the sensed inductance value with a standard in a rebalanceable comparison circuit, generating a signal proportional to the unbalance of said comparison circuit, amplifying and rectifying said unbalance signal, and generating a control flux in said core means as a function of the rectified and amplified signal, whereby the magnetic saturation of said core means is controlled and the inductance value of said inductance winding is controlled in accordance with the value of said standard.

14. Apparatus for controlling simultaneously the inductance values of a plurality of separate inductance windings and for overcoming the effects of ambient conditions on the inductance values of the separate inductance windings comprising controllable inductor means including core means formed of magnetizable material, control winding means, and a plurality of separate signal windings, said signal windings and control winding means being coupled to said core means, a rebalanceable network, alternating voltage means in said network, means included in said network responsive to the extent of magnetic saturation of said core means for controlling the balance condition of said network and controlling the current in said control winding and modifying the magnetic condition of said core means in such direction as to restore the network to balance, manual control means for adjusting the balance condition of operation of said network, whereby the balance condition of said network is made responsive to the extent of magnetic saturation of said core means and the inductance of said separate signal windings is controlled by the adjustment of said manual control means.

15. An inductance control circuit as claimed in claim 7 and wherein a portion of said winding means is coupled into a signal circuit including a tuned circuit.

16. An inductance control circuit as claimed in claim 7 and wherein a portion of said winding means is coupled into a signal circuit including an oscillator, and a frequency discriminator coupled to the output of said oscillator.

17. An inductance control circuit as claimed in claim 7 and wherein a portion of said signal winding means is coupled into a signal circuit including a tuned circuit and said winding portion controls the frequency characteristics of said tuned circuit, and oscillator means coupled to said tuned circuit.

References Cited in the file of this patent
UNITED STATES PATENTS

| | | |
|---|---|---|
| 2,053,154 | La Pierre | Sept. 1, 1936 |
| 2,293,502 | Hermann | Aug. 18, 1942 |
| 2,544,790 | Hornfeck | Mar. 13, 1951 |
| 2,569,309 | Hepp | Sept. 25, 1951 |
| 2,575,494 | Hornfeck | Nov. 20, 1951 |
| 2,600,342 | Tucker | June 10, 1952 |
| 2,645,748 | Hensen | July 14, 1953 |